UNITED STATES PATENT OFFICE.

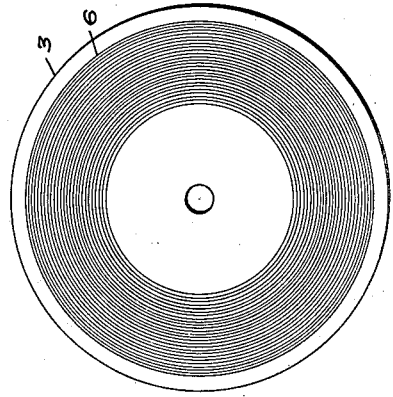
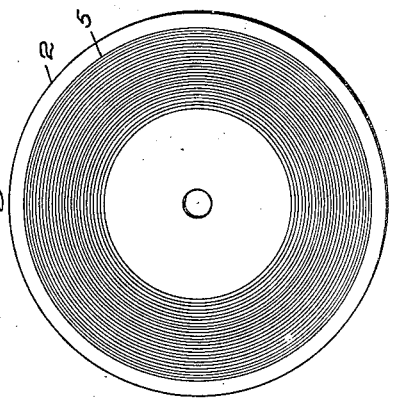
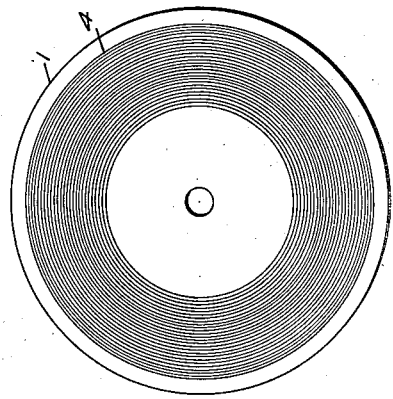
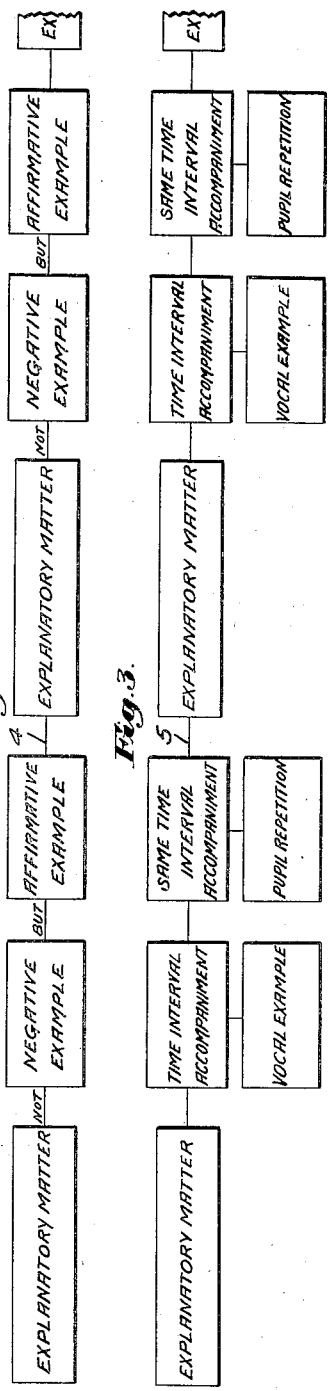
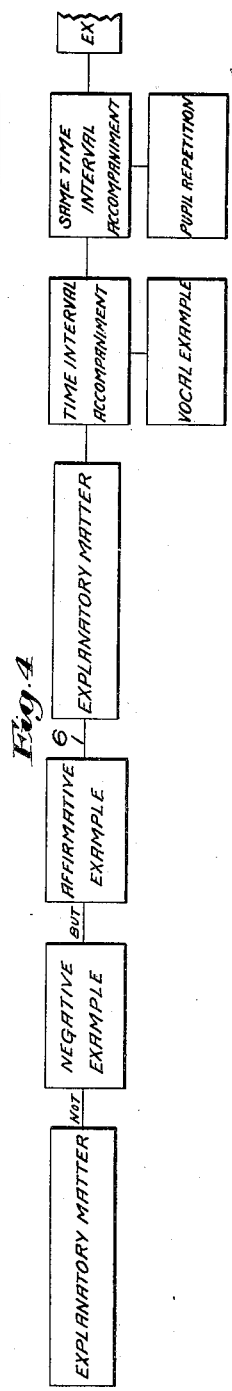

OSCAR SAENGER, OF NEW YORK, N. Y.

EDUCATIONAL APPLIANCE.

1,229,142.                    Specification of Letters Patent.         Patented June 5, 1917.

Application filed August 25, 1913. Serial No. 786,491.

*To all whom it may concern:*

Be it known that I, OSCAR SAENGER, a citizen of the United States, and a resident of New York city, in the county and State of New York, have invented an Improvement in Educational Appliances, of which the following description, in connection with the accompanying drawings, is a specification, like characters on the drawings representing like parts.

This invention consists in improvements in educational appliances, being more particularly intended to assist in vocal teaching through the aid of the phonograph, and to obtain thereby certain results which have heretofore been unattainable by the methods of voice culture commonly in vogue. The object is to provide appliances for carrying out a system of voice culture, whereby a fixed, invariable and unchanging standard of practice may be established and availed of at any time and place, as well by the distant pupil as by the studio pupil.

By means of this invention, not only may the pupil be instructed as to the facts respecting voice culture, but he is presented with certain standardized vocal practice examples actually reproduced and sounded before him, and is given opportunity for, and assistance in, the practice of such examples, similar to that given in the studio. That is to say, the pupil making use of my appliances is not only verbally instructed by the teacher through the use of the phonograph as to facts and conditions pertaining to the particular vocal subject under treatment, but is caused to listen to the correct reproduction by the phonograph of carefully selected illustrative vocal examples, preferably with an instrumental accompaniment of the same, such vocal examples being followed by identical time intervals without the examples, but preferably with the instrumental accompaniment, the pupil being thus given opportunity to fill in such intervals with an attempted reproduction of the vocal examples, and thus to reproduce in contrasted relationship the tone, scale, phrase, or other example, which has been previously sung by an accurately trained voice under precisely the same conditions of time and accompaniment.

Coupled with the verbal instruction contained upon the phonograph record, there may also be provided as required affirmative examples with interposed negative examples, illustrative of the subject of the lecture. That is to say, the record may be made to reproduce a tone, phrase, or other vocal effort, as rendered by the instructor or by some assistant vocalist, first in an incorrect way and illustrating some common fault, and then by contrast in the correct way, so that the pupil has in close contrast and relationship the correct and incorrect methods, and thereby learns to employ the former and avoid the latter.

By the use of sound records such as are hereinafter described, not only is there incorporated in an unchangeable form, which may be duplicated many thousands of times, an invariable and correct standard of vocal practice examples always available to the pupil, but the latter also has an invariable standard practice interval, and also is provided with a standard accompaniment by which he is enabled to practice such standard examples in a comparative or contrasting manner.

The invention will be best understood by reference to the following description, when taken in connection with the accompanying drawings illustrating one specific embodiment thereof, while its scope will be more particularly pointed out in the appended claims.

In the drawings:

Figure 1 represents a series of disk sound records, which may be employed in carrying out my invention;

Fig. 2 represents diagrammatically the character of the sound record presented by one number of the series;

Fig. 3 represents diagrammatically the character of the sound record presented by the second number of the series; and Fig. 4 is a similar representation of the character of the sound record presented by a third number of the series.

To explain the principles of my system as applied to the requirements of ordinary voice culture, I may describe as an example a related series of sound records which may be employed in giving a course of lessons corresponding to the customary "quarter" of the vocal instructor,—i. e., a course of twenty lessons.

To equip a pupil with the means for such a course, I provide a related series of twenty phonograph records, or sets of records, each record, or set, as it may be, containing the substance of a lesson or lecture. Each lesson or lecture may be embodied upon a single record, or if the length of a single record does not suffice, then two or more phonograph records constituting a set may be employed to contain the substance of the lecture.

In Fig. 1 of the drawings, I have shown as a matter of illustration, three numbers of such a series of records, it being obvious that any number may be provided which may be necessary to carry out the object of the system.

These records may be made by any desired mechanical process, and upon any suitable recording machine. They may be cylindrical, flat, or of other shape, my system being independent of the type or kind of record, or of the specific mode of manufacture, or the machine upon which they are recorded or reproduced. They may be original records, or may be copies duplicated by any known process, it being only necessary that a sound record of the character hereinafter referred to shall be produced by the instructor, or by the instructor and his vocal assistant or assistants, which record is capable of being reproduced at will by the pupil whether the latter be remote or near at hand.

As an illustration of the scope of this system, the first record of the illustrated series referred to, and which will correspond to the first lesson, may be devoted to a general preliminary lecture on singing, either with or without a vocal example such as are hereinafter referred to in connection with subsequent records. The second record or lesson which follows may then give briefly certain features of the usual breathing exercises, each illustrated by such examples as are capable of being reproduced by a sound record, so that the pupil can grasp by the sound of the breathing reproduced on the record what may not be fully grasped in the description.

The third record may then consist of or embody a lecture explanatory of the particular defects which the pupil is in danger of acquiring in his elementary efforts in voice culture, and in this record, I may make use of one of the principles of my invention by interposing the explanatory and descriptive portion of the record with negative and affirmative vocal illustrations of the various features referred to. Thus for example, that portion of the lecture dealing with tone production may be made to contain examples illustrating some common fault which the pupil is likely to acquire, and which has been previously explained, such incorrect example being immediately followed by an affirmative example of tone production illustrating the correct method free from such fault. The latter is thereby impressively featured, and brought to the pupil's ear by way of contrast, so that he more readily learns what method to avoid and what method to develop. In a similar manner, other features such as the "attack" may be explained and illustrated, the faulty attack being first given, followed in contrasting relationship by the correct, or faultless attack. All other elementary faults or defects may thus also be impressively explained and illustrated to the pupil.

The third record of the series just described may be diagrammatically represented in Fig. 1, by the record 1 and its sound groove 4, diagrammatically elaborated by the representation in Fig. 2. By this it will be seen that, interspersed with the explanatory matter which is presented by the undulatory sound groove, are the contrasting negative and affirmative examples also presented by the same sound groove. It will be seen that by this method, the original record once made by a skilled and experienced instructor, aided if desired by a trained and accurate vocalist, may be made to establish an unchanging standard, which can be repeated again and again.

Pursuing the same illustrative set of records, the next succeeding, or fourth, record of the series, and which may be represented by 2 in Fig. 1, may deal with the production of single tones, and in this record, as well as in other records of the series, I may make use of another principle or feature of my invention, whereby means are provided for the pupil himself to reproduce a carefully and correctly given vocal example under the same conditions of time and accompaniment. Thus in the illustrative case, in making the original record, the different single notes of the scale may be separately sung, each one with a piano accompaniment but immediately after the singing of each note, there will follow a time interval identically the same as the time interval of the recorded vocal note, and with the same piano accompaniment, but without the vocal note. When the record is reproduced by the pupil, the second time interval gives the latter opportunity to practice the same note with the same accompaniment. In reproducing the record, therefore, the pupil may hear the note correctly sung to a piano or other instrumental accompaniment, and will then immediately thereafter hear the same piano accompaniment, but without the note, during which interval it will be incumbent on him to sing the same note in close contrasting relationship to the vocal example reproduced by the record, thereby obtaining actual practice closely resembling that had in the actual presence of his instructor. This portion of the record may be produced over and over again by the pupil as often as he desires, until by the process of imitation and comparison, he is enabled to sing the note accurately and correctly. This may then be followed by other illustrative examples, as many as may be required, which serve not only to illustrate the interspersed explanatory matter, but also as exercises to be practised by the pupil.

The sound groove of the 4th record of the illustrated series is diagrammatically represented in Fig. 3. It will be seen that here also, when the record has been carefully and accurately made, there is established an unchanging standard of vocal examples, which are always available either to the studio pupil or the distant pupil, and a series of standard practice intervals and accompaniments.

If it be supposed that the next succeeding record deals with the subject of uniting two tones, the lesson or lecture dealing with the topic may be illustrated in the same way as that previously described by vocal examples of the union of two tones to the piano accompaniment, followed by identically the same interval and the piano accompaniment, but without the voice reproduced by the record, thus permitting the pupil to practice these more advanced vocal examples precisely as if he were present in the studio listening to the voice of the instructor, and under his personal guidance.

The same characteristic practice intervals in the phonograph record may be utilized in connection with a succeeding lecture on the uniting of three tones, another on the uniting of five tones, another on the scale of eighths, on the scale of ninths, and the simple arpeggio, and so on, to the same extent to which the treatment of these subjects requires such practice in the studio itself. All subjects relating to voice culture may be treated by this method, and all exercises necessary to the development of the voice may be had by the method of providing vocal examples with instrumental accompaniment, followed by a similar time interval for the attempted reproduction by the pupil of the same vocal effort.

Similarly, these records may also contain, wherever it is thought desirable by the instructor, the positive and negative examples heretofore referred to, illustrating first the incorrect and then the correct way of performing any given vocal effort. In Fig. 4, I have represented diagrammatically the subject matter of the sound groove 6 of record 3, which contains explanatory matter interspersed both with the negative and affirmative examples, and the vocal examples coupled with practice intervals.

Preferably, though not necessarily, the original records of the vocal examples described are made with the assistance of singers of reputation and merit, so that each record will not only bring to the pupil the personality of the instructor as presented by the descriptive and explanatory part of the lecture, but also the best obtainable vocal examples, which by incorporation in the sound record are thus unchangeably standardized. In this respect, the system presents advantages over studio instruction, for while the voice from which the vocal examples were originally recorded may undergo unconscious change from time to time, the original record of that voice will be invariable in its reproduction.

It will be observed that the distant pupil, listening to and practising with the vocal instruction record of the character described, may not only receive substantially the same instruction at a distance which he may acquire in the studio of the instructor himself, but is also furnished with an instrumental accompaniment for the practice of his exercises through the phonographic reproduction of the instrumental music which is contained on the phonograph record during the practising interval which follows each vocal example. A student of voice culture may, therefore, continue his studies irrespective of the absence of a piano or other instrument of accompaniment.

It will be understood that courses of instruction and records will be prepared which are suitable for a particular kind of voice to be cultivated,—that is to say, it is within the spirit of my invention to prepare lessons of the type described to suit the tenor voice, others for the soprano voice, and so on.

The courses, or series of lectures or lessons, hereinbefore referred to are merely illustrative of a simple and common use to which my system may be applied. After the pupil has developed at the work of the scale from the use of these records, there may follow the practice of vocalizing under precisely the same conditions,—that is to say, the presentation by the record of an example of vocalizing followed by the same time interval and accompaniment for the reproduction by the pupil.

Next may follow a lecture, or course of lectures, on how to sing a song, the same opportunity for practice being afforded the pupil as heretofore described. If desired, also, these and other records may be interspersed with contrasting examples of the correct and incorrect way of performing any particular vocal effort. The same principles may be applied in teaching the correct way to sing songs of all descriptions, employing the same methods to show the incorrect way of singing a phrase, followed by the correct way, or incorrect diction or articulation, followed by correct diction or articulation. Similarly, these records may be employed to teach the development of the oratorical style, and the pupil may be taught both by the opportunity for practice afforded by these records, and by the contrasting examples which they contain, difficult passages of oratorios, operatic airs, and arias.

By my invention, a course in voice culture may be embodied in a series of related units, each comprising a record or set of records, each complete in itself yet forming a part of the system by which the voice is to be cultivated. This permits the instructor to prescribe as it were an order of succession in the use of these records, which may be best fitted for the particular voice under cultivation. That is to say, if the voice is found to be weak or faulty in some department or feature, additional practice may be required of the pupil with the record dealing with that fault or feature, or additional records may be supplied the pupil which specialize in the feature in which practice and instruction are required.

While I have illustrated the application of my invention to a course or series of lectures or lessons as exemplified by a related succession of phonograph records, it will be understood that the same may be exemplified in a record which deals with instruction concerning a single subject, such as a single opera, or operatic air or song. Thus, for example, a record or series of records may be employed to explain to the pupil the "Flower Song" of Gounod's "Faust", or any other selected piece, certain difficult parts being explained and illustrated, and certain passages being rendered by vocalists of reputation, which renditions will be followed by time intervals for the attempted reproduction by the pupil.

While I have herein shown and described for the purposes of illustration one specific embodiment of my invention, it is to be understood that the invention is not limited to the device of the construction referred to, or the particular form or arrangement of parts, but these may be modified within wide limits, without departing from the spirit of the invention.

Having thus described my invention, what I claim and desire by Letters Patent to procure is:—

1. An educational appliance, comprising in combination, a predetermined number or series of related sound records bearing a predetermined succession of instructive examples of vocal production coupled each with instrumental accompaniment, said instructive examples being followed in contrasting relationship by the same time intervals and the same accompaniment alone, thereby to afford opportunity for attempted reproduction by the pupil of each vocal example during the succeeding time interval and with the aid of the succeeding accompaniment.

2. An educational appliance, comprising a sound record bearing one or more instructive examples of vocal production coupled with instrumental accompaniment, said instructive examples being followed in contrasting relationship by the same time interval and the same accompaniment alone, thereby to afford opportunity for attempted reproduction by the pupil of the vocal example during the said second interval and with the aid of the said accompaniment.

3. An educational appliance, comprising in combination a predetermined number or series of related sound records bearing a predetermined succession of instructive examples of vocal production, coupled with instrumental accompaniment, and followed in contrasting relationship by the same time interval and the same accompaniment alone, thereby to afford opportunity for attempted reproduction by the pupil, and presenting also desired affirmative examples with accompanying negative examples also arranged in contrasting relationship.

4. An educational appliance comprising a sound record bearing one or more instructive examples of vocal production coupled with instrumental accompaniment of said instructive examples, being followed in contrasting relationship by the same time interval and the same accompaniment alone, thereby to afford opportunity for attempted reproduction by the pupil of each vocal example, and presenting also one or more affirmative examples coupled with negative examples also in contrasted relationship.

5. An educational appliance comprising a sound record bearing one or more instructive examples of vocal production coupled with instrumental accompaniment, said instructive examples being followed in contrasting relationship by the same time interval but lacking the vocal example, thereby to afford opportunity for attempted reproduction by the pupil of each vocal example during the said second time interval.

6. That method of musical instruction which comprises the following steps, namely, impressing upon a phonograph or other sound record a predetermined succession of instructive examples of vocal production, each coupled with instrumental accompaniment, and following said instructive examples in contrasting relationship by the same time intervals and the same accompaniment alone, thereby affording opportunity for attempted reproduction by the pupil of each vocal example during such succeeding time interval and with the aid of such succeeding accompaniment.

In testimony whereof, I have signed my name to this specification, in the presence of two subscribing witnesses.

OSCAR SAENGER.

Witnesses:
JESSE J. HANDY,
FRANK H. THOMAS.